United States Patent [19]

Bakhmutsky et al.

[11] Patent Number: 4,943,856
[45] Date of Patent: Jul. 24, 1990

[54] METHOD AND APPARATUS FOR INTRODUCING A PAN AND SCAN FEATURE TO HIGH DEFINITION TELEVISION SYSTEMS

[75] Inventors: Michael Bakhmutsky, Spring Valley; Alan P. Cavallerano, Ossining; Mikhail Tsinberg, Bronx; Carlo Basile, Flushing, all of N.Y.

[73] Assignee: North American Philips Corporation, New York, N.Y.

[21] Appl. No.: 330,941

[22] Filed: Mar. 23, 1989

Related U.S. Application Data

[63] Continuation of Ser. No. 199,962, May 27, 1988, abandoned, and a continuation-in-part of Ser. No. 57,847, Jun. 2, 1987, Ser. No. 57,848, Jun. 2, 1987, and Ser. No. 57,849, Jun. 2, 1987, abandoned.

[51] Int. Cl.$^5$ .......................... H04N 7/04; H04N 11/06
[52] U.S. Cl. ....................................... 358/141; 358/12; 358/22; 358/147
[58] Field of Search ..................... 358/11, 12, 14, 22, 358/140, 141, 142, 146, 160, 183, 147

[56] References Cited

U.S. PATENT DOCUMENTS

| | | | |
|---|---|---|---|
| 4,533,936 | 8/1985 | Tiemann et al. | 358/34 |
| 4,564,857 | 1/1986 | LoCicero et al. | 358/11 |
| 4,581,640 | 4/1986 | Cole | 358/12 |
| 4,631,574 | 12/1986 | LoCicero et al. | 358/141 |
| 4,651,208 | 3/1987 | Rhodes et al. | 358/140 |
| 4,654,696 | 3/1987 | Dayton et al. | 358/11 |
| 4,794,447 | 12/1988 | Tsingberg | 358/12 |
| 4,839,720 | 6/1989 | Isnardi | 358/12 |

OTHER PUBLICATIONS

IEEE Transactions on Consumer Electronics, "Decomposition and Recombination of a Wide Aspect Ratio Image for ENTSC Two-Channel Television" by Alan P. Cavallerano, Aug. 1987.

"Edge Stitching of a Wide-Aspect Ratio HDTV Image" by LoCicero et al; IEEE; 1986, pp. 436-440.

*Primary Examiner*—John W. Shepperd
*Assistant Examiner*—Michael D. Parker
*Attorney, Agent, or Firm*—Michael E. Marion

[57] ABSTRACT

A method and apparatus for introducing a pan and scan feature to a multiple-signal high definition television (HDTV) system, so that a compatible signal received by a standard TV receiver may be a panned version of a wide aspect ratio HDTV signal, and so that high quality recombination of the compatible and augmenting signals by an HDTV receiver is possible. A pan and scan data word representing the relative movement of the compatible portion of the HDTV signal is inserted during the vertical blanking period of each frame of the HDTV signal, for causing panning synchronization between an HDTV transmitter and an HDTV receiver. The pan and scan data word corresponds to the beginning read address of a fixed coefficient memory containing video attenuation coefficients, which determine the degree of signal attenuation, to be applied at each pixel location along an HDTV scan line. The coefficient memory is addressed in a wrap-around manner, so that if the starting address in the read cycle is other than zero, the reading continues until the highest address in the memory is reached, and then address zero et seq. are read on up to the address before the starting address. By changing the points of passage, attenuation and suppression along scan lines, panning occurs.

12 Claims, 6 Drawing Sheets

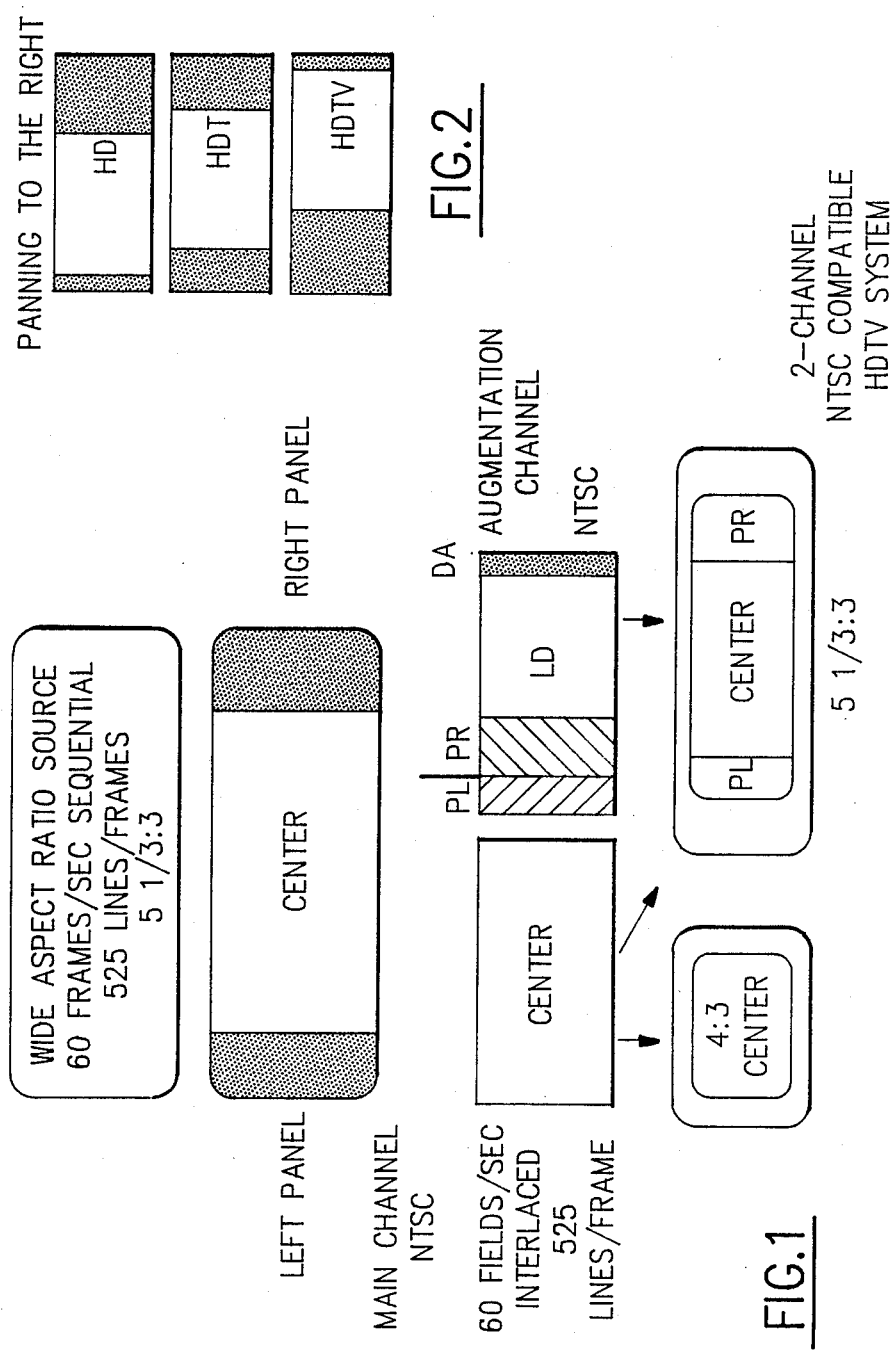

METHOD AND APPARATUS FOR INTRODUCING A PAN AND SCAN FEATURE TO HIGH DEFINITION TELEVISION SYSTEMS

This application is a continuation of U.S. Ser. No. 199,962, abandoned, filed on May 27, 1988 and a continuation in part of U.S. Ser. Nos. 057,847, copending; 057,848, copending, and 057,849, abandoned, all filed on June 2, 1987. Related patents are U.S. Pat. Nos. 4,581,640 and 4,694,338 assigned to the common assignee.

BACKGROUND OF THE INVENTION

The present invention relates generally to high-definition television (HDTV) systems. More specifically, the present invention relates to a method and apparatus for introducing a pan and scan feature in the compatible channel of a multiple-signal HDTV system.

In a typical multiple signal HDTV system with two channels, an HDTV signal, which requires a larger bandwidth than is available on a standard television (TV) channel, is converted into two signals—one of them compatible with a standard TV receiver, such as an NTSC receiver—to be broadcast in separate channels. An HDTV receiver then combines the two signals to form an HDTV picture having, for example, a wider aspect ratio (width of the picture divided by its height) and greater resolution than for a standard picture. One prior art scheme for broadcasting such signals divides the HDTV signal into a center portion to be broadcast in the compatible channel, and information representing panels contiguous to the center portions along with other augmenting information in the second (augmentation) channel.

Because the HDTV picture is wider than that of a standard TV signal, it is desirable to introduce a pan and scan feature to the compatible channel so as to selectively focus the picture received by a standard receiver on different portions (horizontal) of the HDTV picture; i.e., pan and scan. For example, important details in an HDTV picture may appear at the the leftmost edges of the picture. Without a pan and scan feature, the standard receiver will always receive only the same fixed portion of HDTV picture to the exclusion of information at the edges of the HDTV picture.

Introducing a pan and scan feature involves additional complexity to an HDTV system since the portion broadcast in the compatible channel is variable with respect to its position within the HDTV picture, thus making the panels and other augmenting information variable in their relative dimensions.

SUMMARY OF THE INVENTION

It is an object of this invention to provide a multiple-signal HDTV system with a pan and scan feature in its compatible signal.

It is also an object of this invention to provide for simple and efficient recombination (automatic) of a panned compatible signal with an augmenting signal, without a reduction in the quality of the the picture producible by an HDTV receiver.

Another object of this invention is to introduce a pan and scan feature which automatically controls proportioning of the information in the augmenting signal, and cooperation between the compatible and augmenting signals.

It is a further object of this invention to implement the above objects with simple hardware.

The preferred embodiment of the present invention realizes the above objects and others by defining a pan and scan data word to be placed in the vertical blanking period of each frame of the HDTV signal. The pan and scan word is an error-coded representation of the proportional relationship between the left and right panels. For each channel, each pixel in a scan line is multiplied by an appropriate attenuation (gating and fading) coefficient, with the result being that the signal at that location is fully passed, fully suppressed, or attenuated to some degree. The attenuation coefficients for gating and fading the picture panels and the center are stored in symmetrically arranged read-only memories (ROMs).

The attenuation coefficients are set in the memories in such a manner that if the coefficients are read from address zero and applied successively along a received HDTV scan line until the final address and scan line location are reached, a center portion and, a left and a right panel are produced wherein the panel sizes are equal. This is one possible case where no panning occurs. The coefficient memories can be read out in a wrap-around fashion by the applied addresses. During each scan line the same number of coefficients, regardless of which address is the beginning address of the read cycle (equal to the number of pixels on a scan line) are read out, and when the memories reach their highest address, address zero and further addresses are then read out, and the reading continues until the starting address of the read cycle is reached.

Panning is accomplished by beginning the reading cycle of the coefficient memories at an address other than zero. For example, if the first address read out of the coefficient memory (and hence the pan and scan data word) is greater than zero—100 out of 1023 possible, say—the left panel will be smaller than the right panel in the augmentation channel, indicating that the HDTV signal is being panned to the left. During the scan line in question, the pan and scan memories will begin to be read at address 100, proceed through each location to address 1023, wrap around to address 0 and continue until address 99 is read out.

The actual panning may be introduced to the system either manually or by an automatic means (coded with the source image around the time of production, for example).

BRIEF DESCRIPTION OF THE DRAWINGS

The present invention is described by the specification with reference to the accompanying drawings. Briefly described, the drawings are:

FIG. 1 is a diagram of a two-channel HDTV system with one of its channels being compatible with a standard TV receiver;

FIG. 2 is an illustration of a panned wide aspect ratio HDTV signal;

DETAILED DESCRIPTION OF THE INVENTION

The present inventive method and apparatus may be applied to a two-channel HDTV system such as the one shown in FIG. 1, but is not limited to the particular HDTV system. In the preferred HDTV system shown, the HDTV picture has an aspect ratio of 5⅓:3 or 16:9 (as opposed to the NTSC 4:3 aspect ratio), and sequentially scans 525 lines per frame at a frame rate of 60 hertz (Hz). This is in contrast to an NTSC system picture, which scans 525 lines per frame (via two fields) in an interlaced manner at a frame rate of 30 Hz.

The HDTV picture is separated into a left panel, a center portion and a right panel, with the center being broadcast in a main or compatible channel (labelled such because the signal in that channel is compatible with an NTSC receiver), and the two panels (PL and PR) being broadcast in the augmentation channel. Also included in the augmentation channel of the preferred HDTV system are line differential signals (LD) to enable the greater sequential scan frame rate of the original HDTV picture in an HDTV receiver, and digital audio sound (DA). An NTSC receiver can receive and display the signal broadcast in the main channel. An HDTV receiver recombines the signals in the main and augmentation channels to reproduce the HDTV picture.

FIG. 2 illustrates panning to the right by the center portion in an HDTV signal. In this example of panning, the center portion starts near the left edge of the HDTV and advances to the right of the HDTV picture with time. It should be noted that with panning to the right, the left panel increases in width while the right panel decreases in width.

Figure 3:
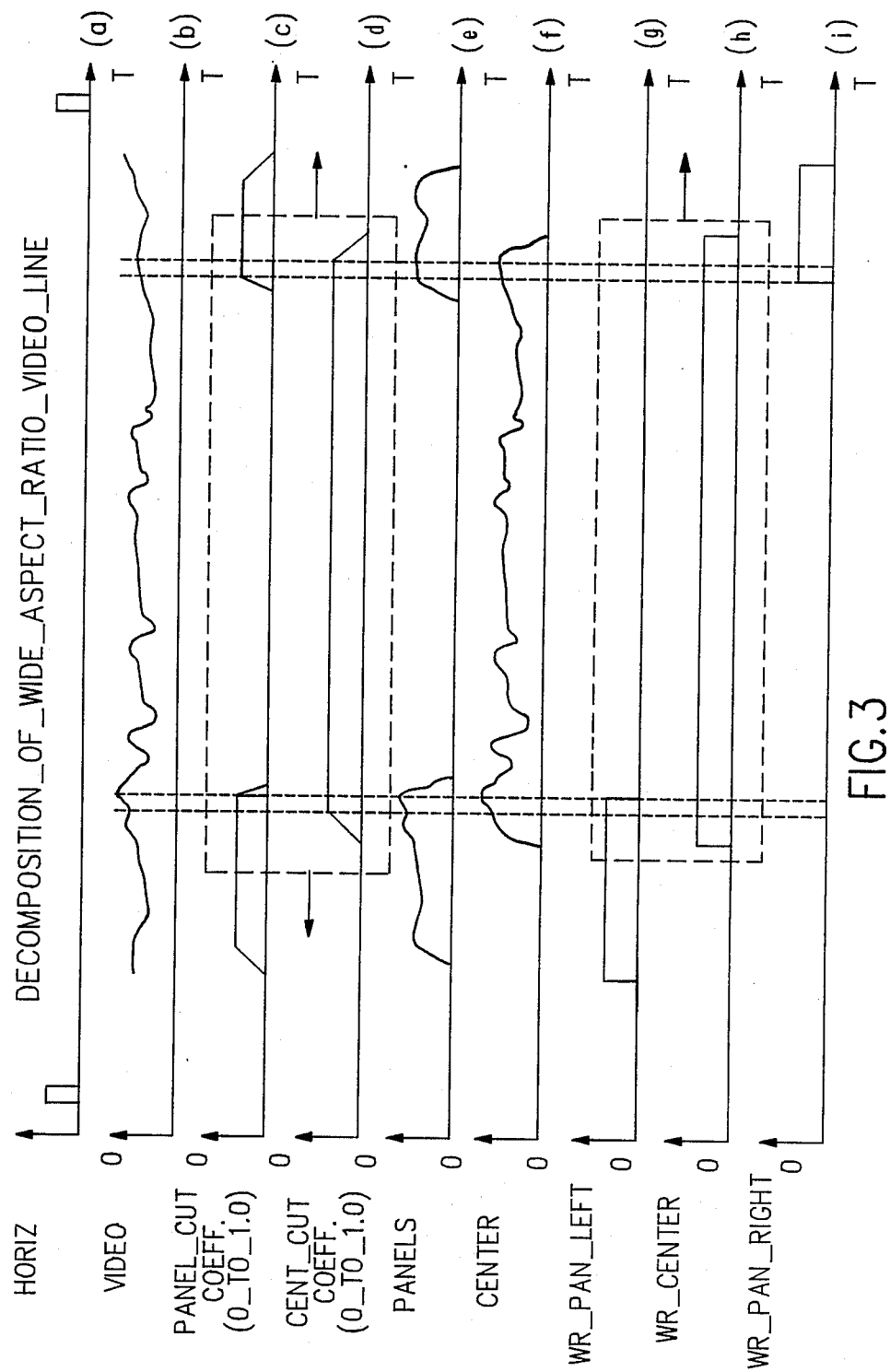
FIG. 3($a$–$i$) illustrate the decomposition of a wide aspect ratio HDTV signal into two panels and a center portion, along with changes in relative dimensions caused by panning.

FIGS. 3a–3i show the decomposition of a wide aspect ratio HDTV picture scan line (see FIG. 3b) during the interval between the horizontal sync pulses of FIG. 3a, to panels and a center portion. Assuming that there are 1024 pixels in each HDTV scan line and taking into account the relative aspect ratios of the preferred HDTV system and that of an NTSC system, the center portion has a width of 768 pixels and the combined width of the two panels is 256 pixels. The panels and the center portion are obtained by multiplying each pixel of the scan line by an attenuation coefficient or factor varying from zero to one, representing total suppression and complete non-suppression, respectively. For the picture signal in the augmentation channel (see FIGS. 3c and 3e), the attenuation coefficient starts out after the blanking transition and 1 at the beginning of the active line time of the left panel, and rapidly decreases to 0 in the transition region between the left panel and the center portion. The attenuation coefficient rapidly rises from 0 to 1 in the transition region between the center portion and the right panel and remains at 1 to the end of the scan line. The information representing the panels can then be combined in the augmentation channel. For production of the main channel picture signal (see FIGS. 3d and 3f), the attenuation coefficient begins at 0 and rapidly rises to 1 in the transition region between the left panel and the center portion, and rapidly decreases to 0 at the end of the center portion area in the transition region between the center and the right panel.

The transition regions—rather than abrupt changes—exist to eliminate the ringing effect.

FIGS. 3g–3i show that when panning to the right occurs, the left and right panels increase and decrease, respectively.

The attenuation coefficients for each pixel location along a scan line of the HDTV picture are stored in a fixed or semi-fixed memories such as a read-only memories (ROMs) or programmable read-only memories (PROMs). The coefficients are symmetrically arranged in the PROMs, and are read out in a wrap-around manner; i.e., if the beginning address of the read cycles are other than zero, after reading from the highest address in the memories, the memories are addressed to wrap around to begin reading the data at address zero, et seq. until the read cycles are complete. Each time a scan line is encountered, 1024 attenuation coefficients (the number of locations in a memory cycle) are sequentially read out from each PROM and separately applied—for each channel—to the HDTV picture signal at the appropriate pixel locations.

In the preferred embodiment for the augmentation channel memory or augmentation PROM, addresses 0–127 contain attenuation coefficients equal to 1, save a few of the upper addresses in this range which are in the narrow transition region. As previously stated, the coefficients in this transition region rapidly vary from 1 to 0. The length and attenuation gradient of the transition regions are a matter of design choice. Except for the narrow transition regions on each side, the coefficients stored at addresses 128–895 are equal to 0. Likewise, the coefficients for addresses 896–1023, except for the narrow transition region at the beginning of these addresses, is equal to 1.

In the main channel memory or main PROM, the coefficients stored at addresses 0–127 are equal to 0, the coefficients stored at addresses 128–895 are equal to 1, and the coefficients stored at addresses 896–1023 are equal to 0. It should again be noted that narrow attenuation regions are present near addresses 128 and 896.

Figure 4:
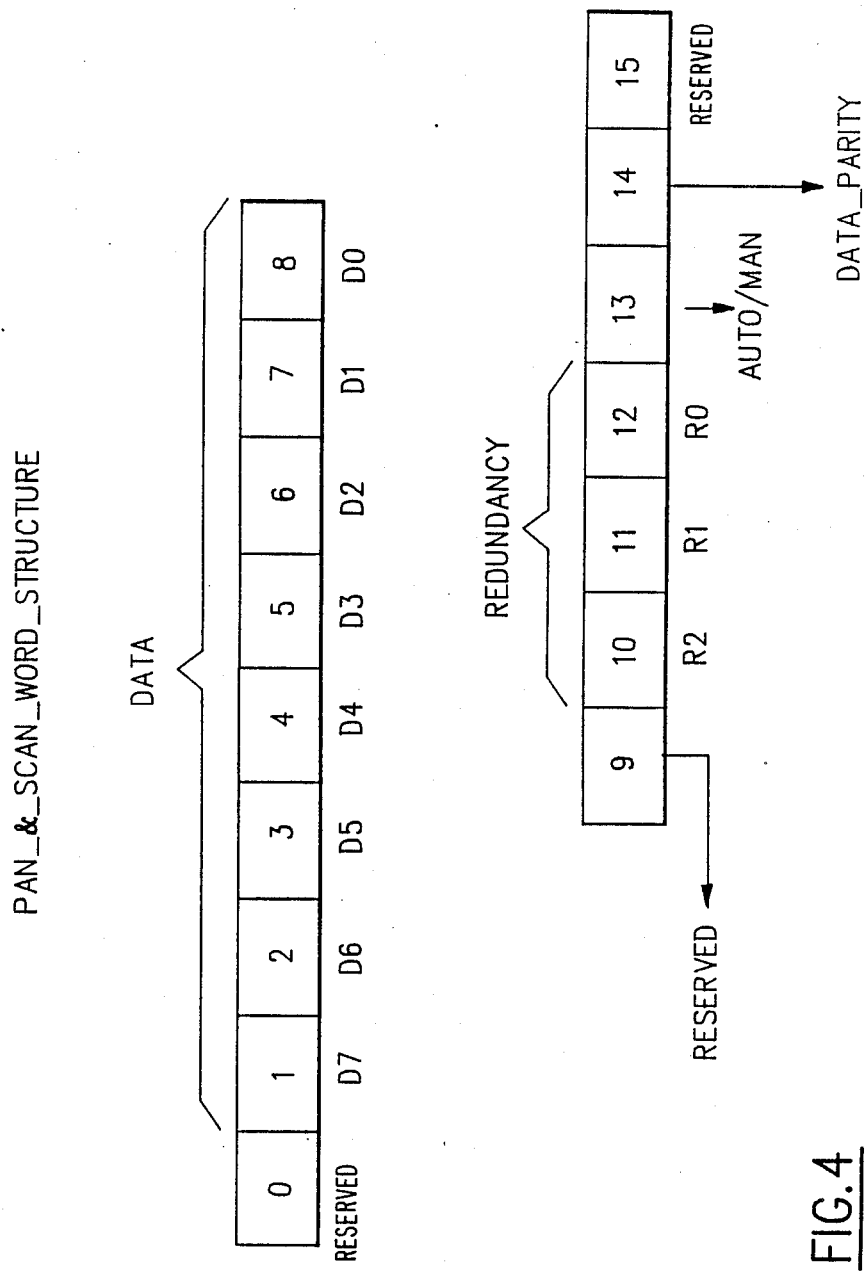
FIG. 4 is an illustration of a structure for the pan and scan data words used in the present invention.

A digital pan and scan data word such as the one shown in FIG. 4 conveys to the pan and scan system, where the points of cut in the scan line for the panels and center portion are. This data word occurs during the vertical blanking period of the HDTV signal, and is transmitted to the HDTV receiver, as well as to the means for broadcasting the main channel. The pan and scan data word is of an error coded type. Hence, the pan and scan data word may contain, for example, 16 bits representing data ($D_0$–$D_7$ for indicating the starting addresses for reading the PROMs), and redundancy bits $R_0$–$R_2$ in the figure. The error coded data word, may also include a parity bit (14), and a bit (13) indicating whether the panning is being performed manually or automatically. The exact specification of the pan and scan data word will not be further discussed since there are many ways known in the art for error coding such a data word. Thus, the structure in FIG. 4 is purely for illustrative purposes. The read cycle can begin anywhere from address 896 (full left panel and no right panel indicating that the picture has been panned to the extreme right edge) to address 127 (full right panel and no left panel indicating that the picture has been panned to the extreme left edge). As was previously stated, beginning the reading of the memories from address 0 indicates that no panning has occurred.

Figure 5:
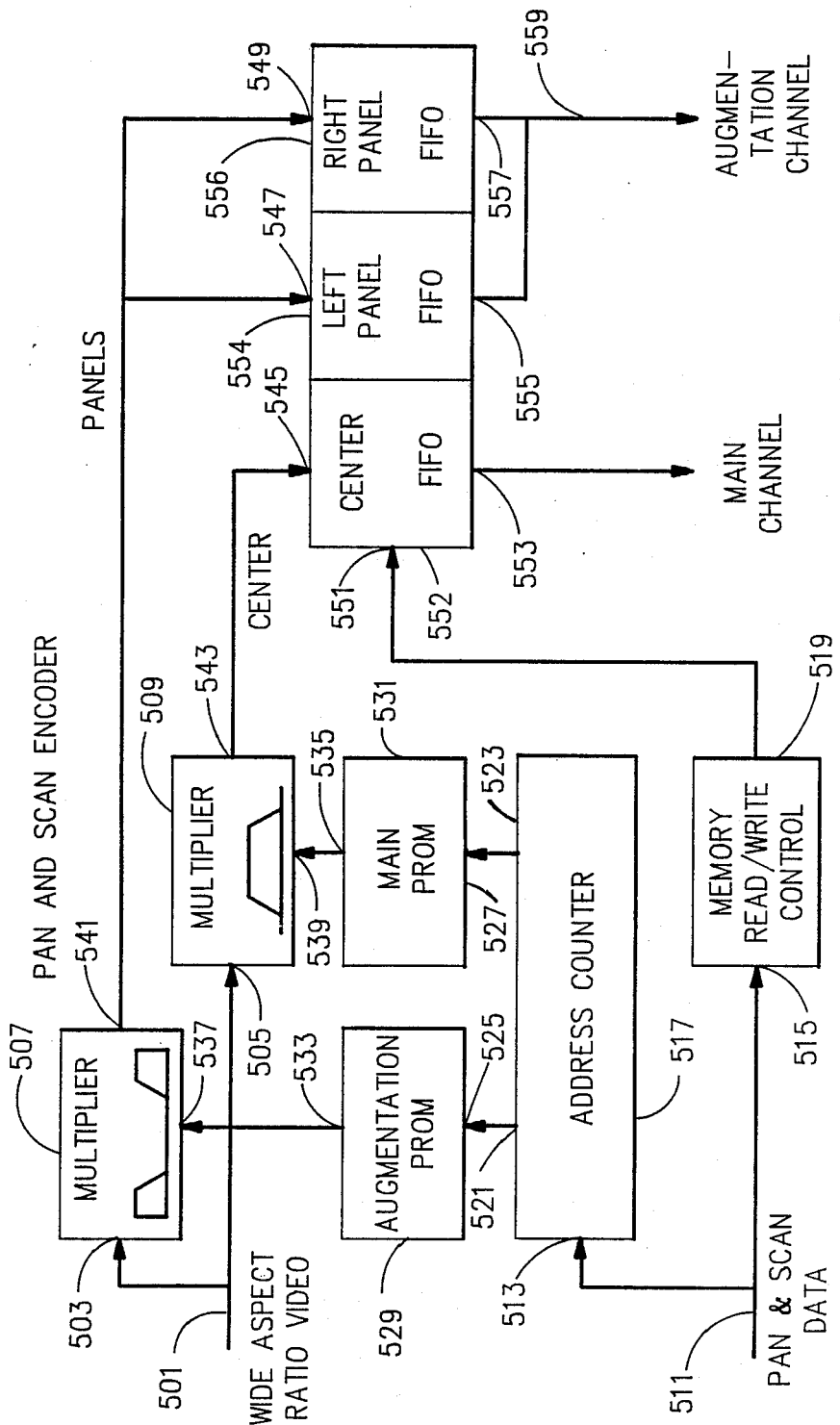
FIG. 5 is a schematic block diagram of a pan and scan encoder usable in the present invention.

FIG. 5 shows a pan and scan encoder suitable for use in the present invention. The HDTV video signal, first introduced to the encoder at input 501, is applied to the inputs 503 and 505 of the augmentation and main multipliers 507 and 509, respectively, for multiplication by the attenuation factors. The pan and scan data words, supplied by the means for introducing the actual panning to the system (not shown) are applied at input 511, and then to an input 513 of an address counter 517 and to input 515 of a memory read/write control 519. In response to the pan and scan data words, the address counter 517 supplies the beginning addresses for the read cycles via outputs 521 and 523 to inputs 525 and 527 of the augmentation PROM 529 and the main PROM 531, respectively. Thereafter, the PROMs 529 and 531 sequentially supply the attenuation coefficients for the scan line via outputs 533 and 535 to the inputs 537 and 539 of the multipliers.

The coefficient-multiplied video signal representing the panels in the augmentation channel is produced at output 541 of the multiplier 507, while that representing the center portion in the main channel appears at the output 543 of the multiplier 509. The center information for the main channel is stored via an input 545 in a center FIFO (first in, first out) register 552, while the panel information is stored via inputs 547 and 549 in a left panel FIFO 554 and a right panel FIFO 556, respectively. The reading and writing of the of the information into and out of the FIFOs is controlled by the memory read/write control 519 in response to the pan and scan data words. The FIFO output 553 produces the video information for the main channel, while the outputs 555 and 557 are combined at output 559 to produce augmentation channel video information.

Figure 6:
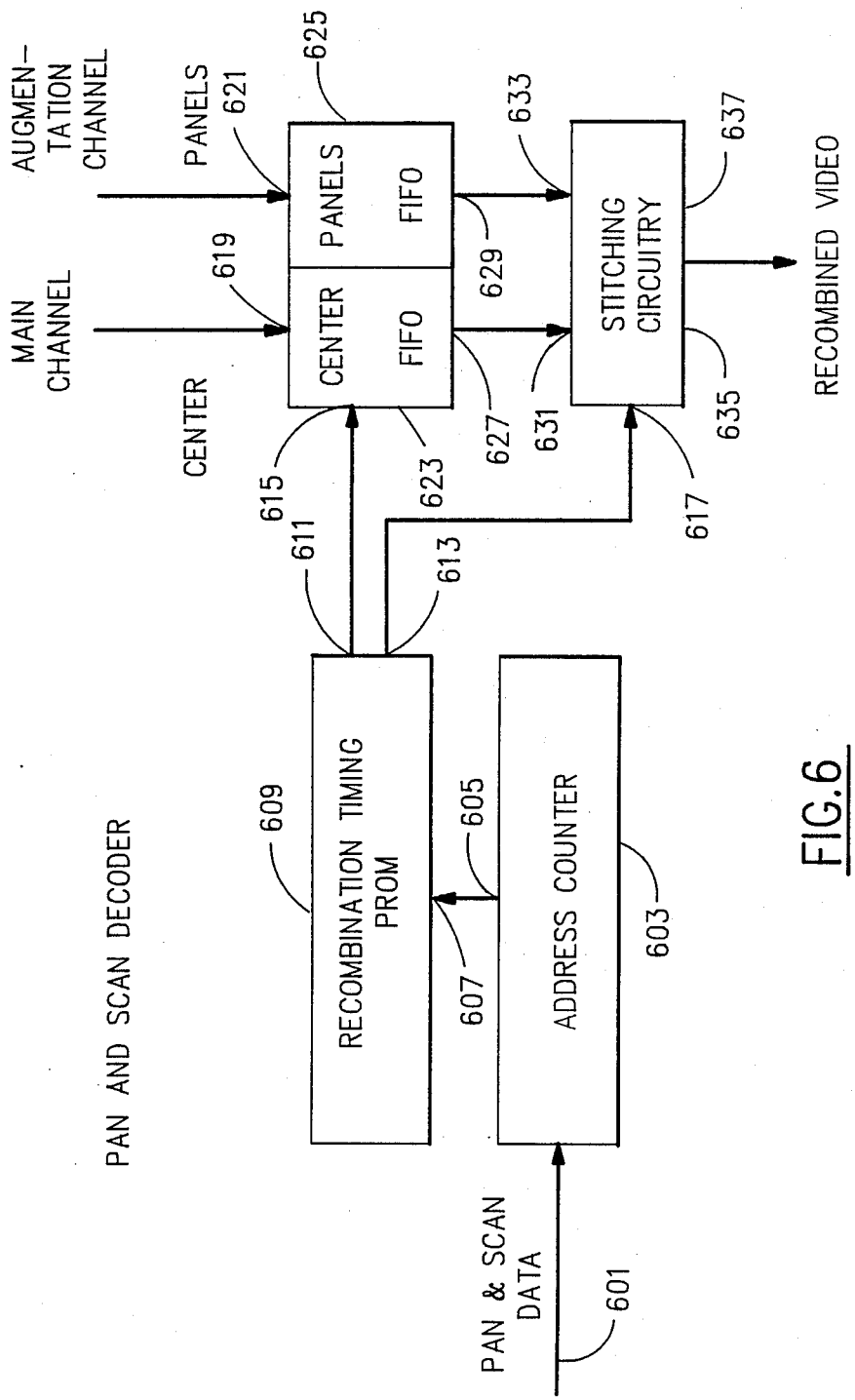
FIG. 6 is a schematic block diagram of a pan and scan decoder usable in the present invention.

A pan and scan decoder compatible with the encoder of FIG. 5 is shown in FIG. 6. The decoder in FIG. 6 is part of an HDTV receiver, and is indeed essential for proper operation of the receiver if panning is introduced to the broadcast video signals. The pan and scan data word received during the previous vertical blanking interval of a frame of video information to be recombined in the HDTV receiver is applied to an input 601 of an address counter. In response thereto, the address counter 603 outputs a beginning address for the read cycles of all of the scan lines in the frame from output 605 to input 607 of a recombination timing PROM 609. The PROM 609 outputs stored timing signals representing the points of cut via outputs 611 and 613 to the input 615 of center FIFO 623 and panel FIFO 625, and input 617 of stitching circuitry 635 the scan lines and is of a wrap-around type.

The FIFOs 623 and 625 receive video signal information from the main and augmentation channels at the inputs 619 and 621 for temporary storage. The PROM 609 controls the operation of the FIFOs in such a manner that the the left panel is produced from FIFO 625 (output 629), then the center from FIFO 623 (output 627), followed by the right panel from FIFO 625.

The panels and center portion are applied to the inputs 633 and 631 of stitching circuitry 635 for their recombination. A recombined video signal for eventual viewing is output by the stitching circuitry 635 at output 637.

Figure 7:
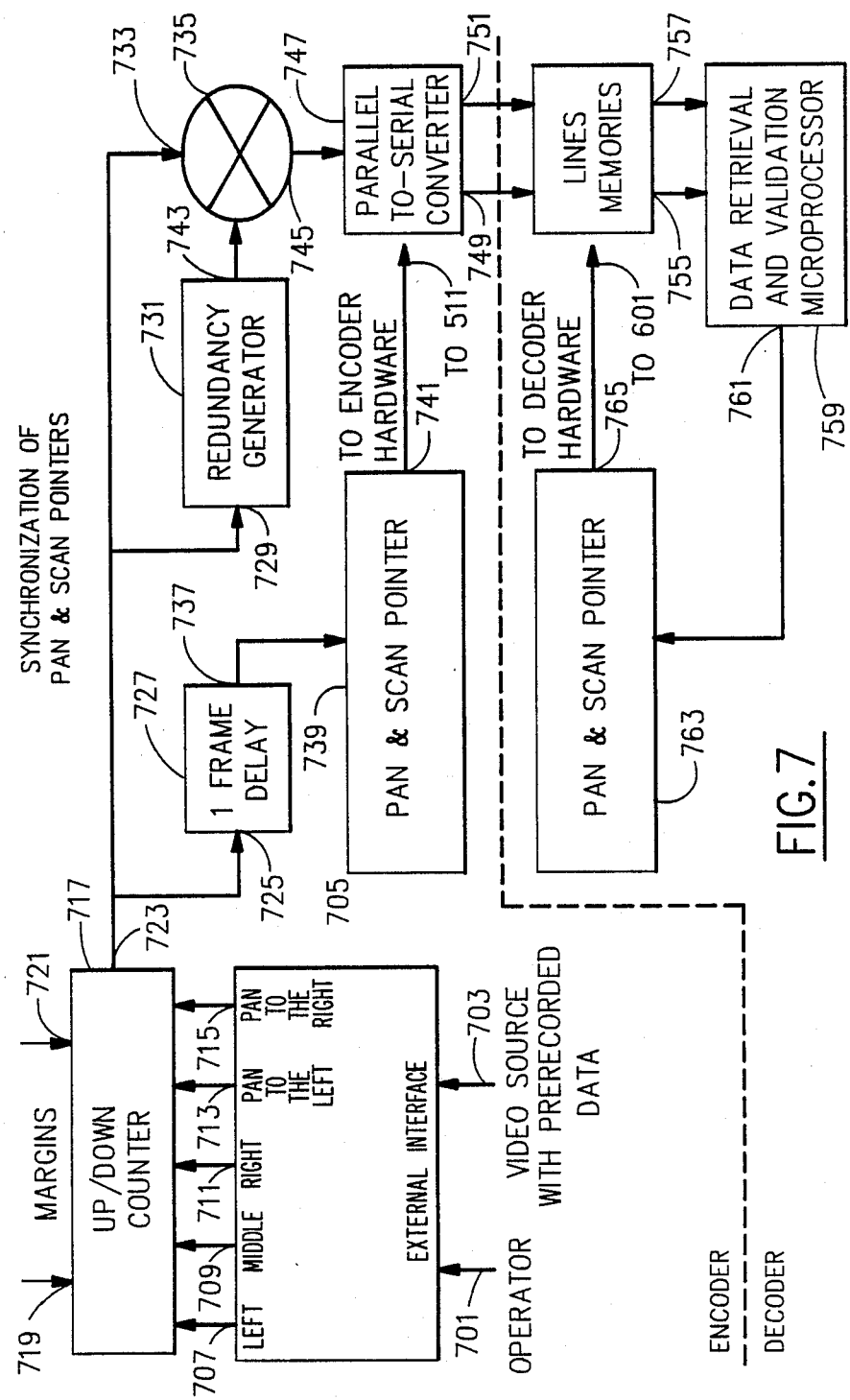
FIG. 7 is a schematic block diagram illustrating pan and scan data word production and movement from an HDTV transmitter to an HDTV receiver, to effect pan and scan synchronization between the two.

In FIG. 7, means for synchronizing the pan and scan encoder and decoder is shown. Panning information is input either by an operator at 701 or is a part of a video source with prerecorded data at 703, to an external interface 705. The external interface 705 converts the input panning signals into switching signals understandable by the system, such switching signals being output by the external interface circuit 705 at outputs 707–715. The outputs 707–715 control the relative positioning of an up/down counter 717, which via output 723, generates numbers for determining the pan and scan data. The margins input at 719 and 721 are the upper and lower limits of the up/down counter 717. These limits are needed, since in the preferred embodiment, panning never reaches the extreme position in which a panel is completely eliminated. The up/down counter 717 contains a number of counting positions equal to the number of pixels in a video scan line.

The output of the information at 723 is applied at an input 725 of a frame delay 727, an input 729 of a redundancy generator 731, and to an input 733 of a mixer 735. The frame delay 727 delays the output of the counter 717 by one frame and applies this signal via path 737 to a pan and scan pointer 739. The pan and scan pointer 739 outputs pan and scan data words at output 741 which determine the relative size of the panels for a given frame of video information. The pan and scan data words output at 741 are applied to the input 511 of the pan and scan encoder in FIG. 5 (described supra).

The redundancy generator 731 introduces redundancy and error coding via output 743 to the mixer 735. The mixer 735 outputs error coded pan and scan data words matching those output by the pan and scan pointer 739—save error coding and a 1 frame delay—to a parallel-to-serial converter 747 for transmission in the vertical blanking intervals of the HDTV signal from outputs 749 and 751.

The pan and scan decoder receives the transmitted signals (including pan and scan data) and stores them in a line memory 753. The outputs 755 and 757 of the line memories 753 are applied to a data retrieval and validation microprocessor 759 for separation of the pan and scan data from the received television signal, and for validation of the pan and scan data. The data retrieval and validation microprocessor 759 outputs the pan and scan data words via path 761 to a pan and scan pointer 763. Many validation and error correction methods are known to those skilled in the art, and they will not be detailed here.

The pan and scan pointer 763 operates in the same manner as the pointer 739 to output pan and scan data words via its output 765 to the input 601 of the pan and scan decoder in FIG. 6 (described supra).

Variations and modifications to the present invention are possible given the above disclosure. However, variations and modifications which are obvious to those skilled in the art are intended to be within the scope of this letters patent. For example, the present invention need not be limited to panning of conventional composite video information (i.e., luma and chroma, etc.), but may include such other video information as line differential signals, etc. Also, the panning need not be limited to the horizontal direction. Additionally, the pan and scan system of the present invention need not be limited to an HDTV system in which the main and augmenting signals are transmitted over two channels, but may be transmitted over a single channel, or using other methods of signal delivery. The augmenting signal information need not define panels to be added to the main signal.

The present invention need not have two PROMs to accomplish gating and fading, but may be made to function using only one PROM instead. Indeed, the memories used to store the attenuation coefficients need not be of the PROM type. The pan and scan words may be transmitted at a time other than during the vertical blanking interval.

The subject matter which we regard as our invention comprises the descriptions in the following claims:

We claim:

1. A method for encoding a high definition television (HDTV) picture to comprise a plurality of scan lines divided into a plurality of components of variable proportions each having a plurality of pixels in order to provide a pan and scan capability to a system for transmitting and receiving an HDTV signal, said method comprising the steps of:
   (a) generating a plurality of data words representing the proportional relationship between said components;
   (b) multiplying the pixels of said HDTV picture by a plurality of respective attenuation factors ranging in magnitude from zero to one inclusive, under the control of said data words so as to generate a coefficient-multiplied video signal representing a center portion and a plurality of panels of varying dimensions corresponding to the proportions of said components; and
   (c) combining said coefficient-multiplied video signal with said plurality of data words to form said HDTV signal.

2. A method for transmitting the HDTV signal described in claim 1, comprising the steps of:
   (a) transmitting a first portion of said coefficient-multiplied video signal corresponding to said center portion of said HDTV picture as a main signal; and
   (b) transmitting a second portion of said coefficient-multiplied video signal corresponding to said panels of said HDTV picture as an augmenting signal.

3. The method of claim 2, comprising the additional step of transmitting said data words during the vertical blanking period of said main signal.

4. An apparatus for encoding a high definition television (HDTV) picture to comprise a plurality of scan lines divided into a plurality of components of variable proportions each having a plurality of pixels in order to provide a pan and scan capability to a system for transmitting and receiving an HDTV signal, said apparatus comprising:
   (a) means for generating a plurality of data words representing the proportional relationship between said components;
   (b) means for multiplying the pixels of said HDTV picture by a plurality of respective attenuation factors under ranging in magnitude from zero to one inclusive, the control of said data words so as to generate a coefficient-multiplied video signal representing a center portion and a plurality of panels of varying dimensions corresponding to the proportions of said components; and
   (c) means for combining said coefficient-multiplied video signal with said plurality of data words to form said HDTV signal.

5. The apparatus of claim 4, further comprising
   (a) means for forming a first portion of said coefficient-multiplied video signal corresponding to said center portion of said HDTV picture into a main signal; and
   (b) means of forming a second portion of said coefficient-multiplied video signal corresponding to said panels of said HDTV picture into an augmenting signal.

6. The apparatus of claim 5, further comprising:
   means for inserting said data words during the vertical blanking period of said main signal.

7. The apparatus of claim 4 further comprising:
   a plurality of coefficient memories which symmetrically store said attenuation factors in the form of coefficients, said coefficients each representing an amount of gating and fading to be attributed to a particular pixel, said memories being addressable under the control of said data words.

8. A receiver for receiving the HDTV signal and reproducing the HDTV picture described in claim 4, comprising:
   (a) means for receiving said HDTV signal and deriving therefrom said components and said data words; and
   (b) means coupled to said receiving means, for tracking the variations in the proportions of said components of said HDTV picture in response to said data words.

9. The method of claim 1, wherein said main signal is a conventional television signal.

10. The apparatus of claim 5, wherein said main signal is a conventional television signal.

11. The receiver of claim 8 further comprising means coupled to said tracking means, for stitching said components so as to reproduce said HDTV picture under the control of said tracking means.

12. A decoder for decoding the HDTV signal described in claim 4, comprising:
   (a) means for deriving from said HDTV signal, said components and said data words;
   (b) means coupled to said deriving means, for tracking the variations in the proportions of said components in response to said data words; and
   (c) means coupled to said tracking means for identifying said center portion of said HDTV picture.

* * * * *